United States Patent
Peric et al.

(10) Patent No.: US 10,948,057 B2
(45) Date of Patent: Mar. 16, 2021

(54) BALL SCREW DRIVE WITH FORCE TRANSMISSION ELEMENT AND IMBALANCE COMPENSATION

(71) Applicant: SFS intec Holding AG, Heerbrugg (CH)

(72) Inventors: Edi Peric, Heiden (CH); Stefan Frei, Widnau (CH); Andre Schadlich, Haag (CH); Marijo Zach, Widnau (CH)

(73) Assignee: SFS intec Holding AG, Heerbrugg (CH)

( * ) Notice: Subject to any disclaimer, the term of this patent is extended or adjusted under 35 U.S.C. 154(b) by 0 days.

(21) Appl. No.: 16/389,242

(22) Filed: Apr. 19, 2019

(65) Prior Publication Data
US 2019/0323586 A1      Oct. 24, 2019

(30) Foreign Application Priority Data
Apr. 20, 2018   (EP) ..................................... 18168493

(51) Int. Cl.
*F16H 25/24*       (2006.01)
*F16H 25/22*       (2006.01)

(52) U.S. Cl.
CPC ..... *F16H 25/2209* (2013.01); *F16H 25/2214* (2013.01); *F16H 25/24* (2013.01)

(58) Field of Classification Search
CPC .............................. F16H 25/22; F16H 25/2204
See application file for complete search history.

(56) References Cited

U.S. PATENT DOCUMENTS 5,408,875 A  *  4/1995  Matsushita ............. G01M 1/20
                                                         73/462
5,809,838 A  *  9/1998  Miyaguchi .......... F16H 25/2214
                                                         74/89.44
(Continued)

FOREIGN PATENT DOCUMENTS

DE          10022715      12/2000
DE       102008002627     12/2009
(Continued)

OTHER PUBLICATIONS

NTN Electric Motor and Actuator Catalog No. 7202-II/JE (p. 3) (Year: 2018).*
(Continued)

*Primary Examiner* — Randell J Krug
(74) *Attorney, Agent, or Firm* — Volpe Koenig

(57) ABSTRACT

A ball screw drive having a threaded spindle and a spindle nut which coaxially encloses it at least partially. The spindle nut receives a ball deflector and therefore has an imbalance caused thereby. A force transmission element is positively connected to the spindle nut. The outer surface of the spindle nut has a recess which is dimensioned and arranged to serve as a stop or groove for the force transmission element and also contributes to the imbalance compensation of the spindle nut. An imbalance compensation method is also provided by fixing the action surface as a surface recess such that the smallest width of the recess is at least 3 times as large as the maximum radial indentation thereof. The filling up of at least parts of the recess by the force transmission element is accounted for and the recess is lengthened along the spindle nut for imbalance reduction.

7 Claims, 3 Drawing Sheets

(56) References Cited

U.S. PATENT DOCUMENTS

| | | |
|---|---|---|
| 6,397,697 B1 | 6/2002 | Ninomiya et al. |
| 2014/0245848 A1* | 9/2014 | Ikeda .................. F16H 25/2204 74/89.44 |

FOREIGN PATENT DOCUMENTS

| | | | |
|---|---|---|---|
| DE | 102008002627 A1 * | 12/2009 | ........... B62D 5/0448 |
| DE | 102010046613 | 3/2012 | |
| DE | 102016120249 | 4/2018 | |
| EP | 2713078 | 4/2014 | |
| JP | H11344094 | 12/1999 | |
| JP | 2010048276 | 3/2010 | |

OTHER PUBLICATIONS

Rexnord Standard Metric Keys and Keyways for Metric Bores with One Key (Year: 2006).*

* cited by examiner 49 44 42

49 44 42

49 44 42

49 44 42

49 44 42

BALL SCREW DRIVE WITH FORCE TRANSMISSION ELEMENT AND IMBALANCE COMPENSATION

INCORPORATION BY REFERENCE

The following documents are incorporated herein by reference as if fully set forth in the European Patent Application No. 18168493.7, filed Apr. 20, 2018.

FIELD OF THE INVENTION

The present invention relates to a ball screw drive, in particular with a force transmission element which encompasses a spindle nut and which for diverting force uses features of the spindle nut, which in turn serve for the imbalance compensation.

BACKGROUND

Generally a roller screw drive is denoted as a recirculating ball spindle or even a ball screw drive (BSD) with balls as the rolling bodies. From a technical point of view, a ball screw drive functions as a worm gear, the step-down gearing and/or step-up gearing thereof being determined by the dimensioning of the threaded spindle, more specifically by the pitch of the thread.

In many technical applications ball screw drives are used primarily in engineering and preferably in tool machines within this field. Increasingly, however, ball screw drives are also used as longitudinal drives in fields where previously hydraulic systems were generally used, for example in injection-moulding machines and power assisted steering. Additionally, ball screw drives also play an increasing role in electromechanical and electro-hydraulic braking systems, where the ball screw drive may be used as a replacement for hydraulic braking cylinders or simultaneously with known braking systems as the actuating element of brake assist systems.

A ball screw drive according to the prior art is illustrated in FIG. 1. A threaded spindle 12 and a spindle nut 14 encompassing this spindle are included in the main components of the ball screw drive 10. During operation, balls circulate between these two components, wherein the thread flights of the threaded spindle 12 and the spindle nut 14 are configured in a complementary manner and thus are adapted to one another such that they act as ball returns.

The spindle nut 14 is formed of a nut body 13 which has (at least) one opening 17 for a ball deflector 15. In this case, this ball deflector 15 is shown as an insert element which is countersunk in the opening 17. The deflector has the task of lifting out the balls at a first point from the ball return between the spindle nut 14 and the threaded spindle 12 and returning the balls at a second point. The ball return thus represents a bypass which bridges at least one, frequently a plurality of thread flights of the nut-spindle system. This results in a closed circulating path for the balls of the ball screw drive 10.

Due to the construction of the spindle nut, said spindle nut is frequently not constructed symmetrically around its central rotational axis. Specifically the ball return or ball deflector ensures that the main axis of inertia of the spindle nut no longer coincides with the rotational axis which is defined by the axial central axis 18 of the spindle.

This state leads to a dynamic imbalance of the spindle nut when it rotates in operation. This is manifested as increased loading of the bearing parts, fastenings and as a result increased wear of the entire system. Additionally, due to the dynamic imbalances, vibrations are produced which lead to audible operating noise which is frequently undesirable.

It is thus known that by adding and/or omitting weight elements at the correct location, the imbalance of a rotating body may be avoided and/or substantially reduced. In the case of a mass-produced part this may be tested, for example, on prototypes and then implemented in production.

A method for removing the imbalance is to provide recesses which as far as possible are identical but mirror-symmetrical, such as for the ball deflector(s) in the spindle nut, and to offset said recesses by 180°. Alternatively, two such compensation recesses which are axially offset in each case by 120° may also be provided. Relative to an imbalance caused by the ball deflector, however, this is costly due to the complex geometry.

FIG. 2 shows a spindle nut body 20 with two recesses 24 and 25 which represent openings (milled recesses and/or apertures) provided for ball return channels. Two recesses 22, 23 are provided for compensating for the imbalance which is produced by the ball deflector(s). The recesses 22, 23 are represented as grooves with a planar base which is advantageous in terms of production technology but differs from the aforementioned formula of mirror-symmetrical apertures.

Ball screw drives are generally used such that either the threaded spindle is stationary and driven so that the spindle nut may move along the spindle or vice-versa. In any case, with spindles and spindle nuts, elements have to be provided which permit the component to be securely fixed or driven; in other words which permit a torque to be introduced or diverted.

Frequently gearwheels are used to this end, said gearwheels being able to be produced as a separate component and pressed, welded or adhesively bonded onto the spindle nut. Alternatively, other force transmission elements are also conceivable such as friction wheels, toothed belt disks or the like. The term force transmission element, therefore, is to be understood as all machine elements which permit torques to be transmitted to or from the spindle nut.

PRIOR ART

DE 10 2008 002 627 A1 discloses a ball screw drive, the spindle nut thereof having compensating means which counteract an imbalance produced by the single-sided ball return and which are arranged and dimensioned such that a main axis of inertia of the recirculating ball nut at least approaches the rotational axis of the threaded spindle. The aforementioned document achieves this by additional recesses on the inner face of the spindle nut.

The document DE 10 2016 120 249.5 proposes to insert surface recesses on the outer face of the spindle nut as compensating means. These surface recesses have the advantage that they may be produced more easily in terms of production technology.

SUMMARY

Proceeding from the prior art, the object of the present invention is to provide a spindle nut which improves the deflection of force and/or torque between a force transmission element and the spindle nut and at the same time minimizes the cost of production of the imbalance compensation.

This is achieved by at least one recess being arranged and dimensioned on the outer face of a threaded spindle such that it serves as a groove or stop surface for receiving a complementary feature of a force transmission element and at the same time represents part of a recess providing (combined) imbalance compensation. In other words, the result of this arrangement and dimensioning is that a main axis of inertia of the combined spindle nut and force transmission element at least approximately coincides with a rotational axis of the combination during operation.

Generally, the base body of a spindle nut (without considering flanges or added-on parts) is designed as a substantially cylindrical body which has recesses for the ball deflectors. The larger these recesses are and/or the more ball deflectors are provided, the greater the imbalance of the spindle nut. Therefore, it has already been proposed to arrange the recesses distributed on the periphery, whereby the imbalance is partially compensated in turn. Alternatively, it has been disclosed to design specifically the ball deflectors to be as heavy as possible in order to compensate for the loss of mass, in cooperation with the balls deflected at that point. Both solutions, however, increase the costs and/or mounting complexity of a ball screw drive.

It has been shown that surface recesses as described and shown in FIG. 2 may also fulfil the function of imbalance compensation.

The present invention provides that at least one recess 38, 48 is arranged on the outer face, more specifically the outer surface of the spindle nut 34, 44 and dimensioned such that it serves for the force transmission element as a (force) action surface and/or groove for transmitting torque and at the same time contributes to compensating for the imbalance of the spindle nut.

As a method in this case it has proved advantageous to take into account primarily the functional boundary conditions for the force transmission element. "Action surface" in this case in a first design step might be defined as a surface portion of the surface of the spindle nut which is designed to deviate from the basic geometric shape of the spindle nut in order to permit a required (thus specific or predetermined) torque transmission between the force transmission element and the spindle nut. In this case, this surface is not to be understood too narrowly, as only those surface elements onto which forces may be effectively transmitted (thus on which the force components act perpendicular to the surface) but as shown in the case of a groove or recess 22, 23, 38 the entire surface of the recess provided to this end.

This action surface is dimensioned at least such that the desired torque may be securely transmitted, for example as a stop surface or groove in the spindle nut. The feature which is designed to be complementary thereto (feather key and/or drive element) is thus located on the force transmission element. In this case, it is regarded as a second design step that the recess 38, 48 is preferably intended to be designed on the surface. "Surface" means in this case that the recess is not channel-shaped or slotted but has the form of an indentation, the smallest extension thereof in the width being larger by a multiple than the depth of the indentation. FIGS. 5 to 9 show by way of example that with a surface recess according to the definition of this invention, the width b of the recess (as set forth above) is at least 3 times as large as the maximum radial indentation t. In this case, as a point of reference for the width b the point is selected at which the recess starts; in other words, where the deviation starts from the original external geometry of the spindle nut 34, 44. The measurement from b is carried out in this case in a cross-sectional plane to the rotational axis. Similarly, the indentation t is defined as the maximum radially measured deviation of the depth of the recess from the original outer geometry of the spindle nut 34, 44.

If a polygonal profile is provided on the spindle nut 34, 44, this specification may be fulfilled by one side of the polygon being designed to be flattened on the spindle nut, wherein the design of the indentation t may be constituted in an equivalent manner, as shown, and similarly the width d may be viewed as a deviation from the original outer contour of the regular polygon.

A recess according to the invention preferably has the shape of a rectangle with rounded corners and/or corresponds to the shape of a flat slot as the feature 38 illustrated in FIG. 3. The outer lines of this surface are preferably arranged such that the linear portions of the outer line of this surface are located parallel or at right angles to the central longitudinal axis of the spindle nut. Alternatively, the recess may be designed to be square or as a circle or oval, taking into account the aforementioned condition of being designed on the surface.

FIGS. 5 to 9 show by way of example sections through a ball screw drive according to FIG. 4 along a plane E, wherein the proportions of the force transmission element 49 and the spindle nut 44 are not to scale. Additionally, the threaded spindle 42 which is shown in cross section has only been indicated. Design options for the recesses, as may be implemented within the meaning of the invention, are shown by way of example.

In FIG. 5, the recess is implemented as a flat, planar removal of material applied in cross section as a circular segment. In FIG. 6, however, the secant is not designed as a straight line but as a radially inwardly curved base. Alternatively, as shown in FIG. 7, the material removal from the spindle nut periphery may also be implemented as a broad channel with vertically radially sloping walls and a uniform depth t, whereby the base of the channel describes a circular arc. FIG. 8 shows a variation thereof where the base is designed to be flat. FIG. 9, however, shows a polygonal profile which on one side differs from the symmetrical shape. This does not have to take place parallel to a polygonal side but could also take place "across the corner" which, however, alters nothing relative to the principle of the invention.

Preferably, the recess will have a planar base which depending on the technical design may form a peripheral recessed edge toward the outer surface of the nut body (FIG. 8) or may lead at certain points in a flat manner, i.e. without a stepped edge, into the cylindrical outer surface of the nut body (FIG. 5).

The depth of the recess is intended to be selected such that the robustness of the spindle nut body is not impaired. Depending on the wall thickness of the spindle nut body, the depth of the recess will range from a few tenths of a millimetre to a few millimetres.

In a development of the invention, the recess may have a plurality of stepped portions in the depth, in other words a plurality of planes, the bottom surfaces thereof fulfilling the aforementioned condition of an outer surface, with in each case a different radius to the spindle nut longitudinal axis and/or as a staggered arrangement of planar surfaces of the aforementioned type. These stepped surfaces thus form substantially a step-shaped funnel. The determining parameters b and t may also be applied to this embodiment.

As a third design step, the recess is now arranged on the periphery such that the imbalance generated by the ball deflectors reduces or—if this is not possible—increases only as little as possible. Generally the force transmission element itself has to be positioned at a technically predetermined point on the outer face of the spindle nut—the point of the periphery, however, at which the recess (force action surface) is arranged is freely selectable to a certain extent. Therefore, naturally those positions which may already contribute to reducing the imbalance are preferred.

All previous considerations assume that the torque transmission is carried out by a groove-drive element principle extended over the surface; the groove and drive element positively engage in one another. It will be obvious to the person skilled in the art that, as a result, the volume of the recess which has been removed is filled up entirely or partially by the material of the force transmission element and thus is not available for compensating for the rotational imbalance. However, this only applies strictly when the force transmission element 49 and the spindle nut 43 consist of a material of the same density. If the spindle nut is produced from steel and the force transmission element is produced from plastics, the difference in density in the denoted volume is relevant for the imbalance compensation. The reverse case is also conceivable, namely that the force transmission element consists of material of a greater density than the spindle nut. Since the force transmission element, for example in the form of a positioned gearwheel, in turn does not deliver a variable moment of inertia due to its rotational symmetry, it is able to remain discounted in the imbalance compensation. In this manner, the filling up of at least parts of the recess, which is carried out by the force transmission element and by the material of the force transmission element, may be taken into account as a fourth design step.

A surface recess which is defined and arranged according to this geometric specification as the "action surface" is now increased in a fifth design step until no more reduction may be achieved in the imbalance. Preferably, the recess is lengthened along the longitudinal axis of the spindle nut 34, 44. Thus material is removed which is not required and/or available as an action surface and/or contact surface between the spindle nut 34, 44 and the force transmission element 39, 49 but serves primarily for the imbalance compensation.

If this compensation measure is not sufficient for the imbalance compensation, in a sixth design step, instead of one recess two or more such recessed surfaces may be provided, to which the aforementioned dimensioning rules (design step two) also apply. The above-described options for implementation according to FIGS. 5 to 8 may be combined in this case. This (these) further recess(es) may serve, but do not have to serve, as a location for the introduction of force for the force transmission element 50 but may be designed purely as a compensation element for the imbalance compensation. This may be required if, for example, an individual recess is not relevant for stability reasons or such a large surface is not available on the part. Preferably, such surfaces are displaced to the side on the periphery or along the longitudinal axis on the spindle nut body.

The advantage of such a surface recess is that it only slightly weakens the wall thickness of the spindle nut and primarily results in no through-holes in the internal region of the ball screw drive. Additionally, it may be ideally produced from outside with the milled recesses for the ball deflectors in a clamping device. For example, a finger-type milling tool may be used to this end. Moreover, the dynamic imbalance is thus eliminated by the removal of material instead of adding compensating weights.

Proceeding from the teaching of the invention, a person skilled in the art may implement a solution in different ways. By numerical simulation models, the moment of inertia of the combined spindle nut-force transmission element may be calculated and different variants tested. The embodiments set forth above thus serve as frame parameters during the calculation and/or simulation. Moreover, by means of tests on different prototypes an optimization may be determined in a stepwise manner on a corresponding testing bench. The above-described design steps in this case are a preferred method of implementation. In an individual case (depending on the specifications) the sequence of steps may be altered without significantly deviating from the basic idea of the invention.

DETAILED DESCRIPTION

Figure 1:
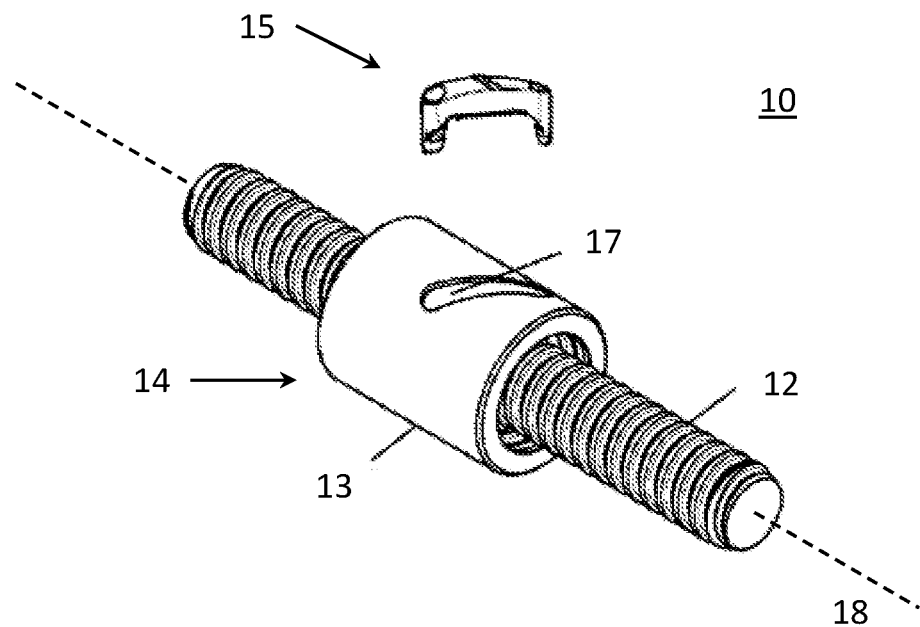
FIG. 1 shows a ball screw drive according to the prior art.

FIG. 1 shows a ball screw drive 10 as known in the prior art and as has been described above in the paragraph "technical background".

Figure 2:
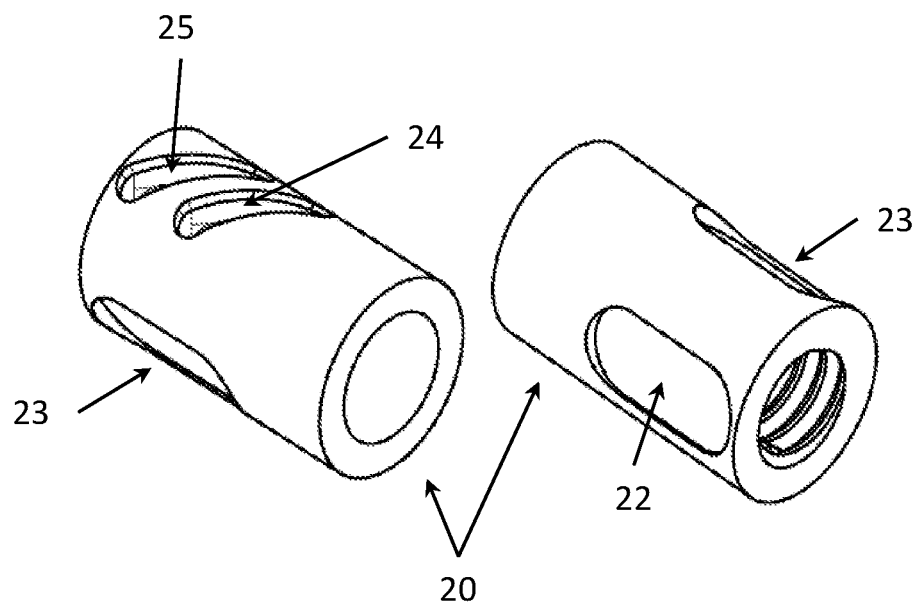
FIG. 2 shows perspective views of a spindle nut body.

FIG. 2 shows a spindle nut body 20 in two views. To the left are shown recesses 24, 25 are shown and openings provided for ball return channels. Ball deflectors may be inserted therein.

Relative to this figure, details have also been provided above in the paragraph "technical background".

Figure 3:
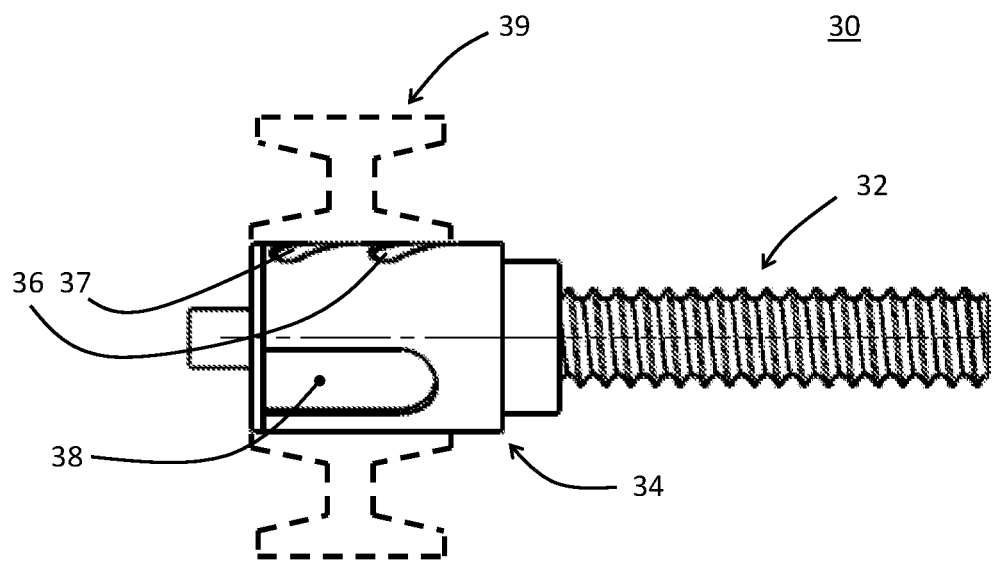
FIG. 3 shows a side view of a ball screw drive.

FIG. 3 shows an assembly consisting of a ball screw drive 30 consisting of a threaded spindle 32 and a spindle nut 34, and the possible position for a force transmission element 39 (marked in dashed lines). It may be seen that in this embodiment both the openings 36, 37 for the ball deflector(s) would be covered by the force transmission element 39, as well as the recess 38.

Figure 4:
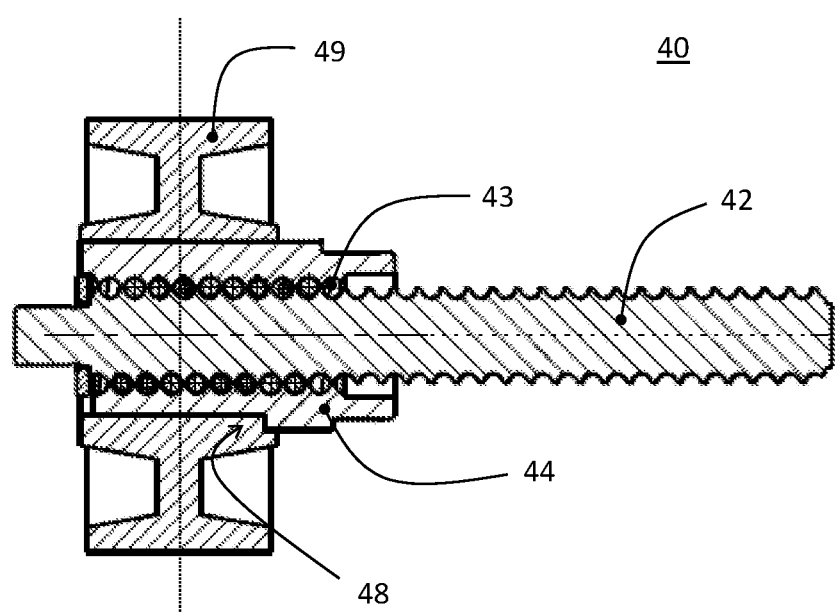
FIG. 4 shows a cross-sectional view through the ball screw drive of FIG. 3.

In FIG. 4 an embodiment according to the invention is shown in cross section. The assembly made up of a ball screw drive 40, formed of a threaded spindle 42 and a spindle nut 44 may be seen. Balls 43 are shown in the space between the threaded spindle and the spindle nut, and the ball deflector is located outside the cutting plane. As may be seen on the lower edge of the spindle nut 44, the recess 48 (equivalent to the aperture 38 in FIG. 3) is covered by the force transmission element 49. At this point, therefore, the force transmission element 49 fills a gap (partially, depending on the design) and thus partially compensates for the loss of material produced. Also illustrated is the cutting plane E which is used in FIGS. 5-9.

FIGS. 5 to 9 show in cross section specifically the overlapping region of the force transmission element 49 which encloses the spindle nut 44 positively and non-positively. The position of a threaded spindle 42 is indicated. The proportions of the threaded spindle 42, spindle nut 44 and force transmission element 49 are not to scale and the view is to be understood as a sketch.

Figure 5:
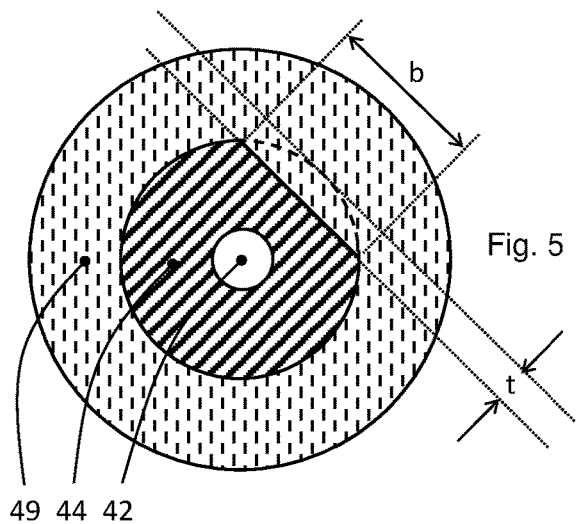
FIGS. 5 to 9 show cross-sectional views through different embodiments of the ball screw drive in the overlapping region of the force transmission element which encloses the spindle nut.

In FIG. 5 the recess (corresponding to features 22, 23, 38, 48) is designed as a flat, planar flattened portion identifiable in cross section as a circular segment. This embodiment may be achieved, for example, by flat grinding or milling, by a material-removing treatment process or cold forming. The width b is determined by the deviation from the original outer contour. The maximum depth t of the material removal is measured radially outwardly from the central axis as a maximum difference between the radius of the original outer contour and the actual outer contour.

Figure 6:
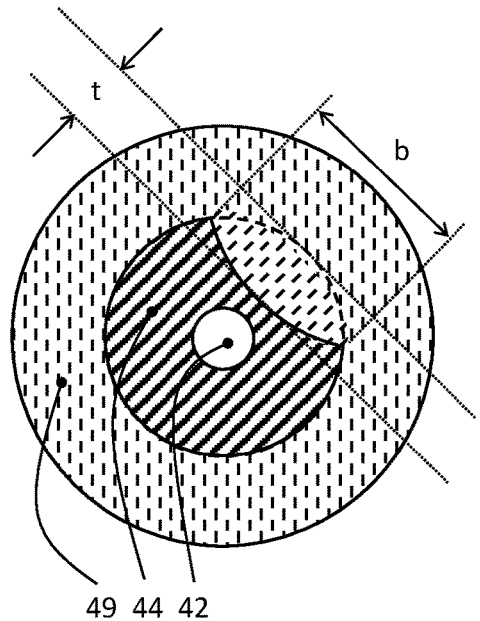

In FIG. 6 the secant is not designed as a straight line but as a radially inwardly curved base. The width is measured as in FIG. 5, and the depth t in turn is defined as the maximum radial deviation from the original outer contour.

Figure 7:
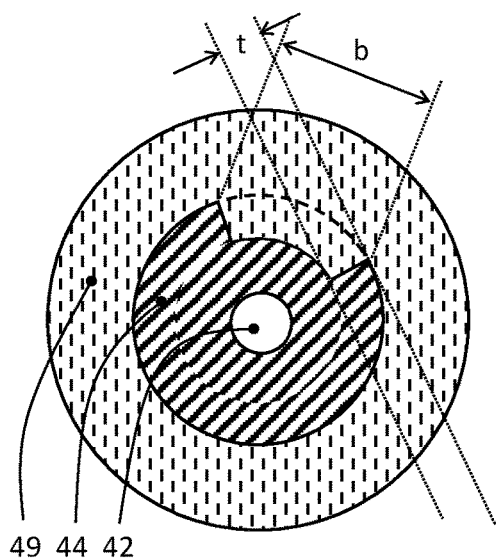

Alternatively, as shown in FIG. 7, the material removal may also be implemented as a broad channel with vertically radially sloping walls and a uniform depth t, whereby the base of the channel describes a circular arc at a uniform distance from the central axis.

Figure 8:
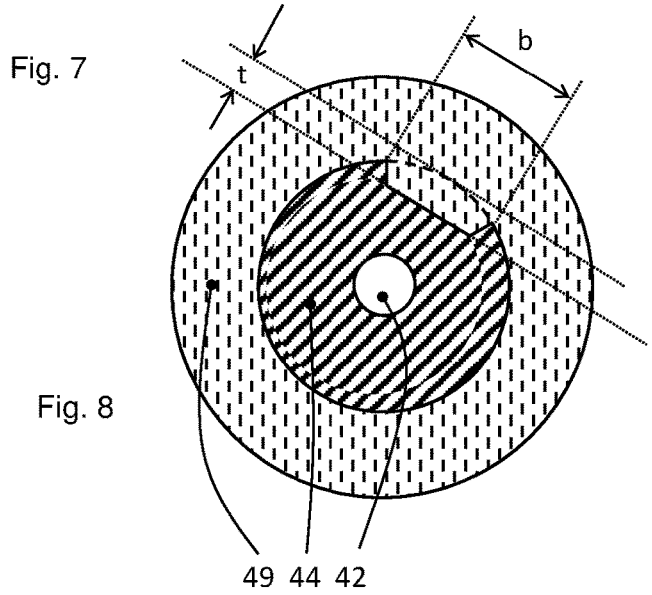

FIG. 8 shows a variant thereof where in comparison the base is also flattened, so as to be designed to be flat.

Figure 9:
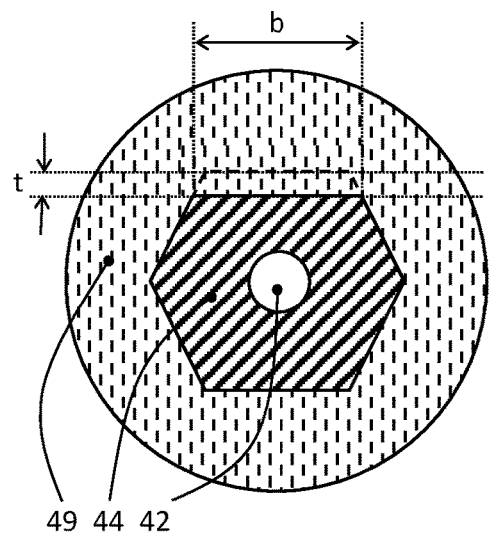

FIG. 9, however, shows a polygonal profile (in this case a hexagon) which on one side deviates from a symmetrical shape. This should not have to be carried out parallel to a polygonal side but could also be carried out "across the corner" which would lead to an irregular seven-sided shape.

Preferably, this recess may have a planar base which, depending on the technical design, may form a peripheral recessed edge toward the outer surface of the nut body (FIG. 8) or at certain points may lead in a flat manner, i.e. without a stepped edge, into the cylindrical outer surface of the nut body (as in FIG. 5).

The depth of the recess is intended to be selected such that the fatigue strength of the spindle nut body is not impaired. Depending on the wall thickness of the spindle nut body, the depth of the recess will thus range from a few tenths of a millimetre to a few millimetres.

The features of the invention disclosed in the above description, in the drawings and in the claims may be essential for the implementation of the invention both individually and in any combination which is, however, technically expedient and/or advantageous.

REFERENCE LIST 10, 30, 40 Ball screw drive
12, 42 Threaded spindle
13 Nut body
14, 34, 44 Spindle nut
15 Ball deflector
17 Opening
20 Spindle nut body
22, 23 Recesses (for imbalance compensation)
24, 25 Recesses (openings provided for ball return channels)
43 Balls
36, 37 Opening(s)
38, 48 Recess(es)
39, 49 Force transmission element

The invention claimed is:

1. A ball screw drive, comprising:
   a threaded spindle;
   a spindle nut which coaxially encloses at least partially the threaded spindle;
   a plurality of balls which may circulate in an intermediate space between the threaded spindle and the spindle nut;
   a ball deflector which is arranged in an opening in an outer surface of the spindle nut;
   a force transmission element which is positively connected to the spindle nut; and
   the outer surface of the spindle nut has at least one recess dimensioned and arranged such that the at least one recess serves as a stop or groove for the force transmission element and is sized based on a density of a material of the force transmission element that is received in the at least one recess in comparison to a density of a material of the spindle nut to simultaneously provide imbalance compensation for the spindle nut.

2. The ball screw drive according to claim 1, wherein the recess has a shape of at least one of: a rectangle with rounded corners, a flat slot, a circle, an oval, or a square recess.

3. The ball screw drive according to claim 1, wherein the recess has a planar base with a peripheral, at least partially recessed, edge toward the outer surface of a nut body of the spindle nut.

4. The ball screw drive according to claim 1, wherein a radially measured depth of the recess ranges from 0.3 millimeter to 3 millimeters.

5. The ball screw drive according to claim 1, wherein the recess includes a plurality of stepped portions or planes in a depth direction, forming a stepped funnel shape.

6. The ball screw drive according to claim 1, wherein the outer surface of the spindle nut has at least one further recess which is dimensioned such that the at least one further recess provides further imbalance compensation.

7. The ball screw drive according to claim 1, wherein the recess is formed by material-removal, grinding, or cold forming.

* * * * *